(12) United States Patent
Free

(10) Patent No.: US 8,254,646 B2
(45) Date of Patent: Aug. 28, 2012

(54) IMAGE PREPROCESSING

(75) Inventor: Robert Mikio Free, San Jose, CA (US)

(73) Assignee: Apple Inc., Cupertino, CA (US)

( * ) Notice: Subject to any disclaimer, the term of this patent is extended or adjusted under 35 U.S.C. 154(b) by 368 days.

(21) Appl. No.: 12/693,368

(22) Filed: Jan. 25, 2010

(65) Prior Publication Data

US 2011/0181746 A1 Jul. 28, 2011

(51) Int. Cl.
*G06K 9/00* (2006.01)
*G06K 9/34* (2006.01)
*G06K 9/46* (2006.01)

(52) U.S. Cl. ........ 382/118; 382/165; 382/171; 382/195; 382/164

(58) Field of Classification Search .................. None
See application file for complete search history.

(56) References Cited

U.S. PATENT DOCUMENTS

| | | | |
|---|---|---|---|
| 5,450,216 A | 9/1995 | Kasson | |
| 6,141,434 A | 10/2000 | Christian et al. | |
| 6,343,141 B1 | 1/2002 | Okada et al. | |
| 6,456,328 B1 | 9/2002 | Okada | |
| 6,476,820 B1 | 11/2002 | Harada et al. | |
| 6,556,708 B1 | 4/2003 | Christian et al. | |
| 6,574,354 B2 | 6/2003 | Abdel-Mottaleb et al. | |
| 6,611,613 B1 * | 8/2003 | Kang et al. | 382/118 |
| 6,697,502 B2 | 2/2004 | Luo | |
| 7,031,543 B2 | 4/2006 | Cheng et al. | |
| 7,120,279 B2 | 10/2006 | Chen et al. | |
| 7,242,409 B2 * | 7/2007 | Cain | 345/594 |
| 7,319,415 B2 | 1/2008 | Gomila | |
| 8,106,961 B2 * | 1/2012 | Nakamura | 348/223.1 |
| 2005/0175227 A1 | 8/2005 | Paschalakis | |
| 2007/0296865 A1 | 12/2007 | Mino et al. | |
| 2009/0169099 A1 | 7/2009 | Ozdemir et al. | |
| 2009/0175557 A1 | 7/2009 | Lankoande et al. | |
| 2009/0263013 A1 | 10/2009 | Xiong et al. | |

OTHER PUBLICATIONS

NPL—Britannica.com Article explaining Munsell Color System (invented in 1905).*
NPL—Ying Dai and Yasuaki Nakano, 1996,"Face-Texture Model Based on Sold and Its Application in Face Detection in a Color Scene".*
NPL—J. Cai, A. Goshtasby, 1999,"Detecting human faces in color images".*
Almohair et al.; Skin Detection in Luminance Images Using Threshold Technique; International Journal of Imaging Science and Engineering (IJISE);vol. 1, No. 1, Jan. 2007; pp. 32-35.
Hua, et al.; Detection and Tracking of Faces in Real-Time Environments; Proceedings of International Conference on Imaging Science, Systems and Technology (CISST '02), 2002.
Connah et al.; Seeing Beyond Luminance: A Psychophysical Comparison of Techniques for Converting Colour Imates to Greyscale; Society for Imaging Science and Technology; 2007; pp. 336-341.
Dai et al., Face Texture Model Based on SGLD and Its Application in Face Detection in a Color Scene; Pattern Recognition, vol. 29, No. 6, pp. 1007-1017, 1996.
Hjelmas, Erik, et al., "Face Detection: A Survey", Computer Vision and Image Understanding 83, 2001, pp. 236-274, Academic Press.
Yang, Ming-Hsuan, et al., "Detecting Faces in Images: A Survey", IEEE Transactions on Pattern Analysis and Machine Intelligence, Jan. 2002, pp. 34-58, vol. 24, No. 1.

* cited by examiner

*Primary Examiner* — Chan S Park
*Assistant Examiner* — Ha Le
(74) *Attorney, Agent, or Firm* — Fish & Richardson P.C.

(57) ABSTRACT

A method performed by a software process executing on a computer system, includes obtaining a digital image having a plurality of pixels encoded in a YUV color space. Each pixel has a luma component of value Y, a blue color-difference component of value U and a red color-difference component of value V. For a specified pixel, the method includes calculating whether U is less than a first threshold and V is greater than a second threshold. The method further includes determining whether the specified pixel potentially depicts an orange hue depending on a result of the calculation.

25 Claims, 14 Drawing Sheets

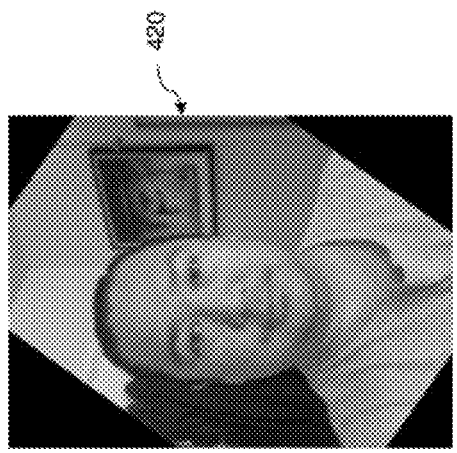
FIG. 4A
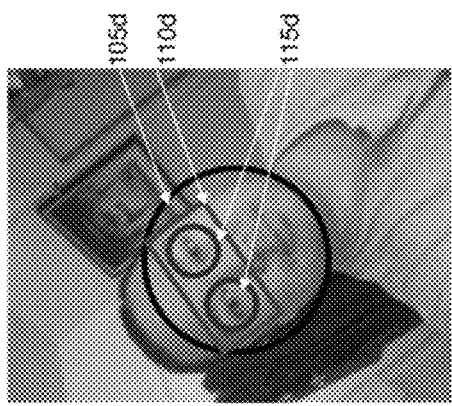
FIG. 4B
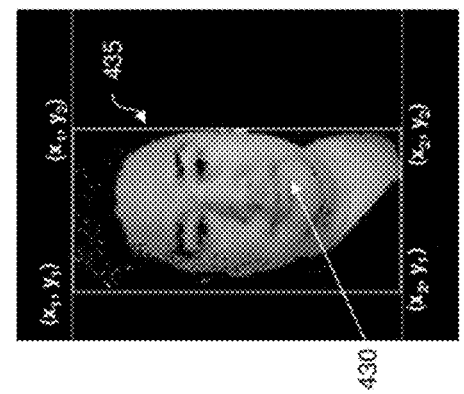
FIG. 4D
FIG. 4C
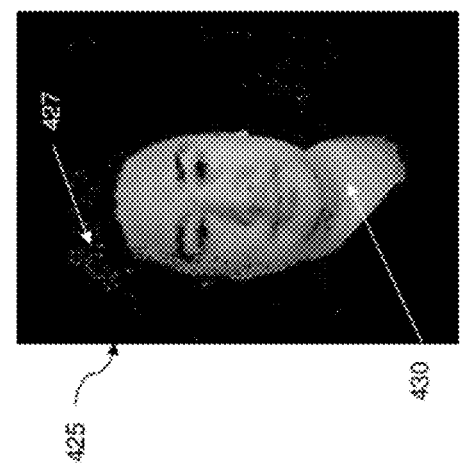
FIG. 4E

 
FIG. 9A
FIG. 9B

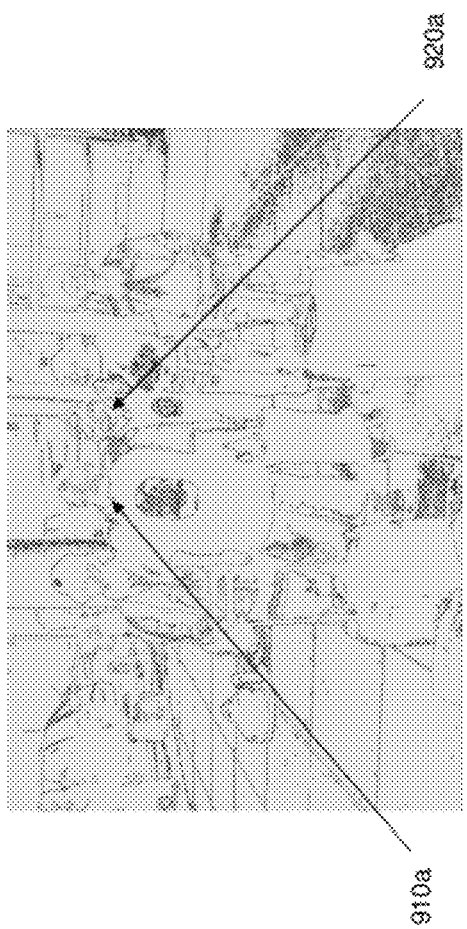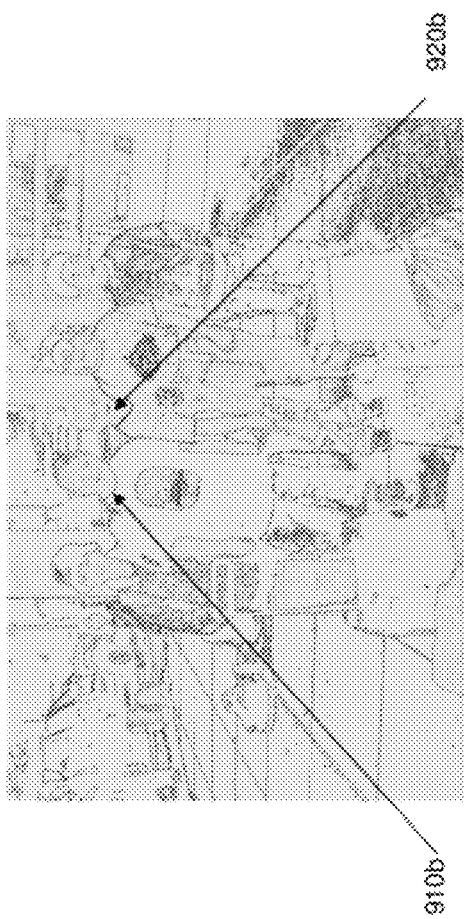
FIG. 9E
FIG. 9F

IMAGE PREPROCESSING

BACKGROUND

This disclosure relates to a system for preprocessing images for applications such as skin tone detection and face detection.

In the ever expanding fields of personal computing and electronic devices, more and more features and functionality are being incorporated into portable devices. For example, many mobile devices such as cellular telephones and personal digital assistants (PDAs) include cameras for capturing images and video. Processing captured images and video on a mobile device is challenging due to limited processing resources available on the mobile platform.

SUMMARY

With the advent of new functionalities, mobile devices are being increasingly used to capture digital images, especially portraits and images of people. Such images may be processed to perform various functionalities such as face detection. Existing algorithms to perform such processing are computationally intensive and consumes significant time and processor power. The present application is directed to fast and efficient methods and systems to preprocess images such that subsequent processing, e.g. to detect faces in the image, can be performed with significantly increased efficiency.

In one aspect, a method performed by a software process executing on a computer system, includes obtaining a digital image having a plurality of pixels encoded in a YUV color space. Each pixel has a luma component of value Y, a blue color-difference component of value U and a red color-difference component of value V. For a specified pixel, the method includes calculating whether U is less than a first threshold and V is greater than a second threshold. The method further includes determining whether the specified pixel potentially depicts an orange hue depending on a result of the calculation.

In another aspect, a method performed by a software process executing on a computer system, includes selecting a first set of pixels in a digital image in the YUV color space. The set is selected such that, for each pixel in the set, a U component is less than a first threshold and a V component is greater than a second threshold. The method also includes identifying at least a subset of the first set as a region of orange hue in the digital image.

In another aspect, a computer program product includes computer readable medium having encoded instructions that, when executed, cause a computer to obtain a digital image having a plurality of pixels encoded in a YUV color space. Each pixel has a luma component of value Y, a blue color-difference component of value U and a red color-difference component of value V. For a specified pixel, calculation is performed to determine whether U is less than a first threshold and V is greater than a second threshold. The instructions further cause the computer to determine whether the specified pixel potentially depicts an orange hue depending on a result of the calculation.

In another aspect, a system configured to obtain a digital image having a plurality of pixels encoded in a YUV color space. Each pixel has a luma component of value Y, a blue color-difference component of value U and a red color-difference component of value V. For a specified pixel, the processor is configured to determine whether U is less than a first threshold and V is greater than a second threshold. The processor is further configured to determine whether the specified pixel potentially depicts an orange hue depending on a result of the calculation.

Implementations may include one or more of the following.

The first and second thresholds can be substantially equal to zero. A determination may be made if a region of orange hue potentially depicts human skin. Determining whether the specified pixel potentially depicts an orange hue can include deciding that the specified pixel potentially depicts human skin if U is less than the first threshold and V is greater than the second threshold. A face detection algorithm may be executed on the digital image if at least a part of the digital image is determined to potentially depict human skin.

If the digital image or a region in the digital image is determined to potentially depict human skin, a temporary image may be generated by masking all non-orange hue areas in the digital image. A face detection algorithm may be executed on the temporary image.

If the digital image or a region of the digital image is determined to potentially depict human skin, a logical bounding box can be generated such that the bounding box encompasses all areas determined to include an orange hue. A face detection algorithm may be executed only on a portion of the digital image within the generated bounding box.

A chroma value for the specified pixel may be calculated by determining a distance of the point (U,V) from the origin on a U-V color plane. The calculated chroma value may be compared against a third threshold for deciding whether the specified pixel potentially depicts human skin. The distance of the point (U,V) from the origin on the U-V color plane may be calculated as an average of U and V.

The methods and systems described herein allow fast implementation of image processing functionalities which otherwise require complex algorithms not suitable for processors with limited processing capabilities. The described methods and systems are computationally inexpensive and therefore particularly suitable for mobile platforms. Image functionalities such as face detection in an image, skin tone detection, noise or speckle reduction and chroma based processing can therefore be implemented on mobile devices without significant deviation in performance.

These and other aspects and features and various combinations of them may be expressed as methods, apparatus, systems, means for performing functions, program products, and in other ways.

Other features and advantages will be apparent from the description.

DESCRIPTION OF DRAWINGS

FIG. 4A-4E depicts images during various stages of face detection.

FIGS. 9A and 9B show a grayscale image and a chroma image, respectively, of the same scene.

FIGS. 9E and 9F show detected edges in the thresholded versions of the grayscale and chroma images, respectively.

Like reference symbols in the various drawings indicate like elements.

DETAILED DESCRIPTION

The inventions described herein can be implemented in many ways. Some useful implementations are described below. The descriptions of implementations of the inventions are not descriptions of the inventions, which are not limited to the detailed implementations described in this section, but are described in broader terms in the claims.

In recent times, more and more effective methods for human computer interaction (HCI) are being developed for a wide variety of computing platforms. Furthermore, with the decreasing price/performance ratio of computing coupled with recent decreases in image acquisition costs imply that computer vision systems are deployed in desktop and embedded systems. Face detection and recognition form an important part of such human-computer interaction. In some cases, face detection is the first step in more complex processes such as face recognition and facial expression identification. Face detection includes detecting locations in images where faces are present. Given an arbitrary image, the goal of face detection is to determine whether or not there are any faces in the image and, if present, return the location and extent of each face. One of the challenges in face detection is to differentiate between actual faces and other regions in an image that may resemble a face in some way.

Figure 1:
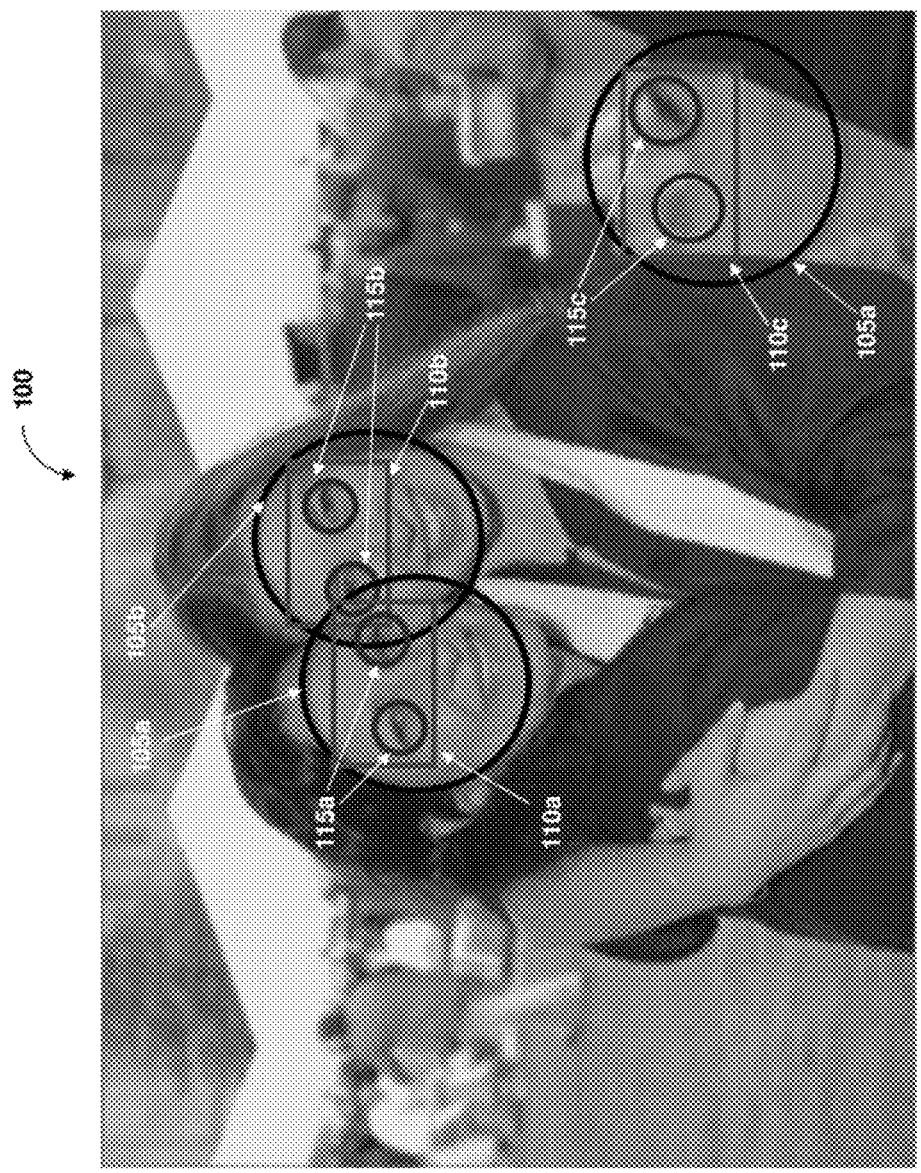
FIG. 1 depicts an example of a false positive in face detection in an image.

Referring now to FIG. 1, an example of such a problem is shown. In this example, when a face detection algorithm is executed on the image 100, the algorithm correctly detects two facial regions 105a, 105b. The algorithm also detects two pairs of eyes 115a and 115b, respectively and two eye regions 110a and 110b. However, the algorithm also detects a person's shoe in the background and erroneously concludes the shoe to be a part of another pair of eyes 115c. Accordingly, the algorithm detects a third facial region 105c and a corresponding eye region 110c. Such erroneous detection may be avoided if the image is preprocessed to mask out or eliminate regions in the image 100 where faces are less likely to be present. In some implementations, such masking may be performed based on detecting regions in the image having skin tone, that is, color information indicating the presence of skin. In such cases, non skin tone regions may be masked out thereby reducing the region of interest for subsequent processing. Such masking also reduces the computational burden on the processor since significantly reduced amount of data has to be processed during the execution the face detection algorithm. At the same time, such preprocessing of the image has to be performed at low complexity and high speed in order to keep the latency of the overall system low.

Fast Detection of Skin Tone in RGB Color Space

The methods and systems described herein efficiently pre-process digital images based on their color properties. Such color properties are often described using color spaces which are mathematical models describing the way colors can be represented as tuples of numbers, typically as three or four values or color components. Examples of color spaces include RGB, CMY, CMYK, YIQ, YUV, YCrCb, HSV, HSI, IHC and HSL color spaces. In general, color spaces may be broadly classified into Cartesian and polar coordinate based color spaces. An understanding of such color spaces is important in the methods and systems described herein and are therefore described next with reference to FIGS. 2A and 2B.

Figure 2B:
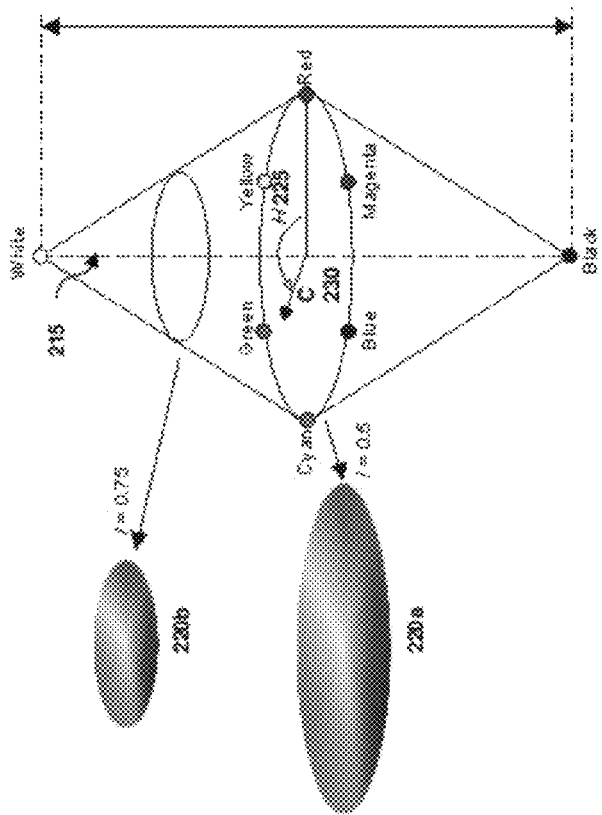
FIGS. 2B-2D depict polar coordinate based color spaces.
Figure 2A:
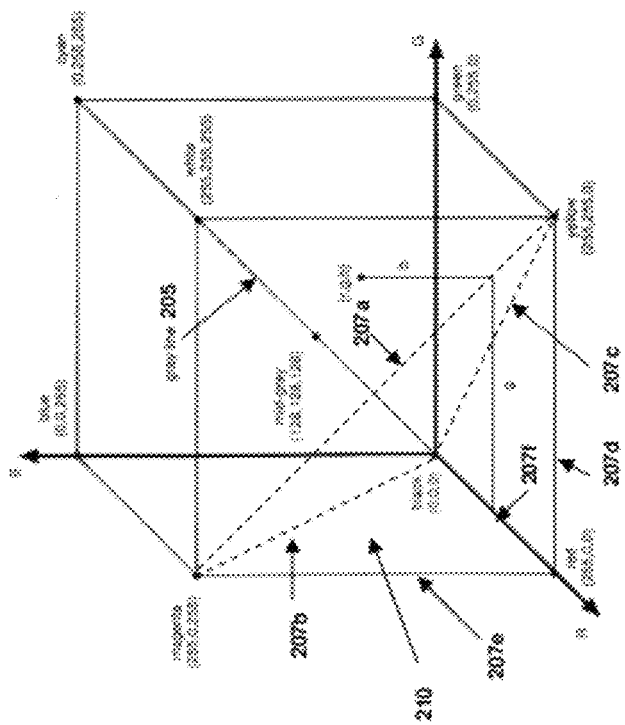
FIG. 2A depicts a Cartesian color space.

Referring now to FIG. 2A, an RGB color space is shown as an example of a Cartesian color space. In this color space or color model, a color is represented in a three dimensional space composed on three colors red, green and blue. The RGB color model is an additive color model in which red, green, and blue light or color are added together in various ways to reproduce a broad array of colors. The main purpose of the RGB color model is for the sensing, representation, and display of images in electronic systems, such as televisions, digital cameras, computers and handheld mobile devices. In the example shown in FIG. 2A, different colors are encoded using three 8-bit unsigned integers (0 through 255) representing the intensities of red, green, and blue. This representation is the current mainstream standard representation in image file formats such as JPEG or TIFF. Such encoding of the RGB space results in more than 16 million different possible colors. As shown in FIG. 2A, the colors at the vertices of the RGB color space may be represented as the following points: (0, 0, 0) is black, (255, 255, 255) is white, (255, 0, 0) is red, (0, 255, 0) is green, (0, 0, 255) is blue, (255, 255, 0) is yellow, (0, 255, 255) is cyan and (255, 0, 255) is magenta. Any point in the volume bounded by these vertices represents a mixed color that can be broken down into red, green and blue components and represented in the RGB space as a point (r, g, b). Further, lines and planes may also be defined in the RGB color space. For example, the line connecting pure black (0, 0, 0) and pure white (255, 255, 255) may be defined as a gray line 205. Other examples of Cartesian color spaces include the YIQ, YUV and YCbCr spaces.

The Cartesian color spaces, while ideal for describing colors in digital formats, are not well suited for describing colors that are practical for human interpretation. For example, human beings do not perceive a color in terms of its component primary colors. Rather, humans usually describe a color by its hue, saturation and brightness or intensity. Hue is an attribute that describes what a color actually is (for example, red, yellow, orange, cyan etc.), whereas saturation is a measure that describes to what extent the color is diluted by white light. Brightness is descriptor that embodies the achromatic notion of intensity and is a key factor in describing color perception. Color spaces based on these attributes of colors are ideal for algorithms related to human perception of color. The IHC (Intensity, Hue, Chroma) color space described with respect to FIG. 2B is an example of such a color space.

Referring to FIG. 2B, the IHC color space includes of a vertical intensity axis 215 and loci 220a, 220b (220 in general) of color points that lie on planes perpendicular to the axis. The hue (H) 225 of a color point within a locus plane (220a for example) is represented by an angle with respect to a reference point while a chroma (C) 230 is represented as a linear distance of the point from the point of intersection of the locus plane 220a with the intensity axis 215. Even though, the example in FIG. 2B shows the loci 220 to be circular in shape, other polygonal shapes, such as triangles, pentagons, hexagons etc, may be used to represent the loci. The area of the loci 220 is a function of the intensity. In other words, the range of chroma is also dependent on the intensity. For example, at zero intensity (i.e. I=0), all colors have zero chroma value and converge to black. Similarly, for the maximum intensity (e.g. I=1), all colors have zero chroma value and converge to white. Within this range, the area of the loci 220 (or the range of chroma values) may increase, for example from I=0 to I=0.5 and then decrease again from I=0.5 to I=1. FIG. 2B shows the locus 220b corresponding to intensity I=0.75. For a given locus plane 220, the hue of a color point is determined by an angle from a reference point. In this example, red designates the reference point, i.e. zero hue, and the hue increases in a counterclockwise direction from the reference point. Other polar coordinate based color spaces, such as the HSL (Hue, Saturation, Lightness) and HSV (Hue, Saturation, Value) color spaces, also follow similar principles with hue being represented as an angle in an polar coordinate based coordinate system.

Figure 2D:
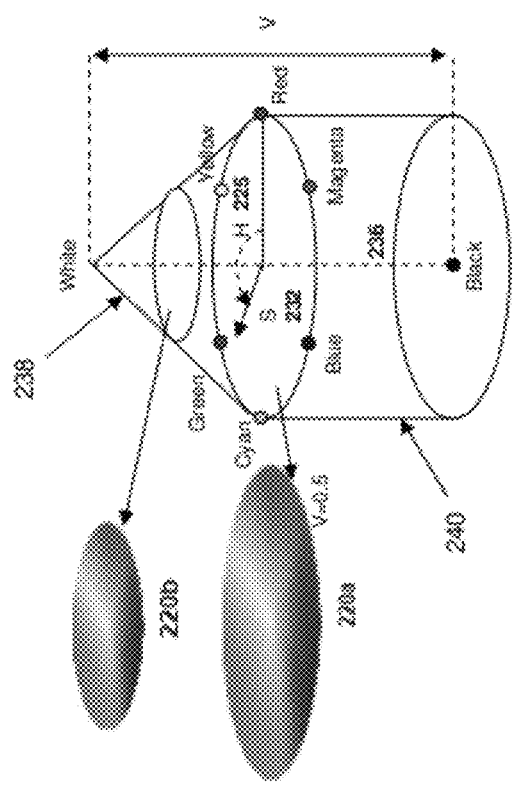
Figure 2C:
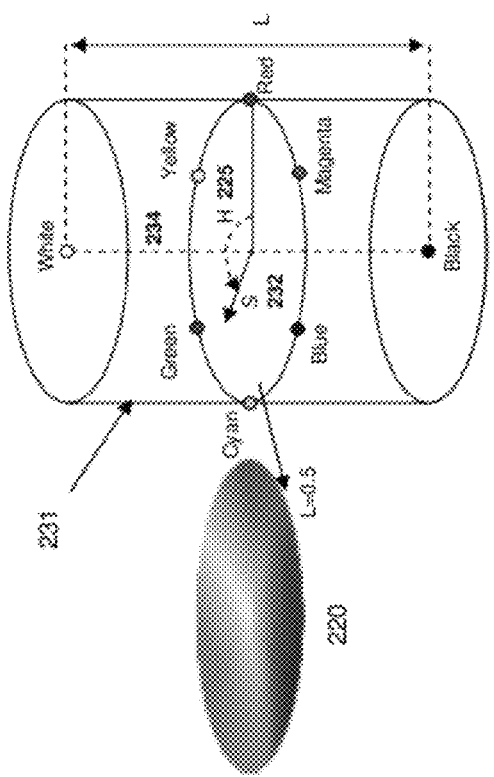

Referring now to FIG. 2C, a HSL color space also includes of a vertical axis and loci 220 of color points that lie on planes perpendicular to the axis. In this color space, the vertical axis represents lightness (L) 234. The HSL color space is also referred to HLS or HSI with I standing for intensity. The HSL color space represents colors as points in a cylinder 231 (called a color solid) whose central axis 234 ranges from black at the bottom to white at the top, with colors distributed between these two extremities. The angle around the axis corresponds to the hue 225, the distance of a point on a given locus 220 from the axis corresponds to the saturation 232, and the distance along the axis 234 corresponds to lightness or intensity. Unlike the chroma 230 in the IHC color space (FIG. 2A), the range of the saturation 232 is not a function of the lightness or intensity.

Referring now to FIG. 2D, a HSV color space represents colors via an inverted color cone 238 on a cylinder 240. The HSV color space includes a common vertical axis 236 for the cone 238 and the cylinder 240. The central axis 236 ranges from black at the bottom to white at the top, with colors represented in loci 220 distributed between these two extremities. The angle around the axis corresponds to the hue 225, the distance of a point on a given locus 220 from the axis corresponds to the saturation 232, and the distance along the axis 234 corresponds to the value V. The value can be scaled to be between 0 and 1. In this color space, the saturation 232 is a function of the value V when V is between 0.5 and 1. For example, when V=1, all colors converge to pure white. When V is between, 0 and 0.5, the range of the saturation is constant and not a function of the value, as shown in FIG. 2D.

Hue information from digital images may be used in the methods and systems for fast preprocessing of images. In some implementations, images may be preprocessed to identify regions of interest based on the presence of a hue representing skin-tone. For example, a presence of an orange hue of any intensity may be used as a test to identify skin-tone. In such cases, the underlying assumption is that a wide range of skin colors (ranging from very light skin colors to very dark skin colors) may be modeled as variations of orange hue with the variations primarily being in the saturation and intensity. As described with respect to FIG. 2B, in general, hue is an attribute of polar coordinate based color spaces while most digital images are represented using Cartesian coordinate systems such as the RGB color model. The RGB color information may be transformed into an polar coordinate based color space such as the HSI color space. For example, the hue may be calculated as:

$$H = \begin{cases} \theta & B \leq G \\ 360 - \theta, & B > G \end{cases}$$

where $$\theta = \cos^{-1}\left\{ \frac{\frac{1}{2}[(R-G)+(R-B)]}{[(R-G)^2+(R-B)(G-B)]^{1/2}} \right\}$$

The saturation component is given by:

$$S = 1 - \frac{3}{(R+G+B)}[\min(R, G, B)]$$

The intensity of the component is given by:

$$I = \frac{1}{3}(R+G+B)$$

As seen from the above equations, converting RGB images to polar coordinate based representations such as the HSI to extract hue information is computationally expensive especially due to the divisions involved in such conversions. Such conversions are therefore not desirable for limited resource processors such as found in most mobile platforms. The present application describes methods and systems for detecting the presence of orange hue in images based on their RGB representations without converting the representations into any other color space.

Figure 3:
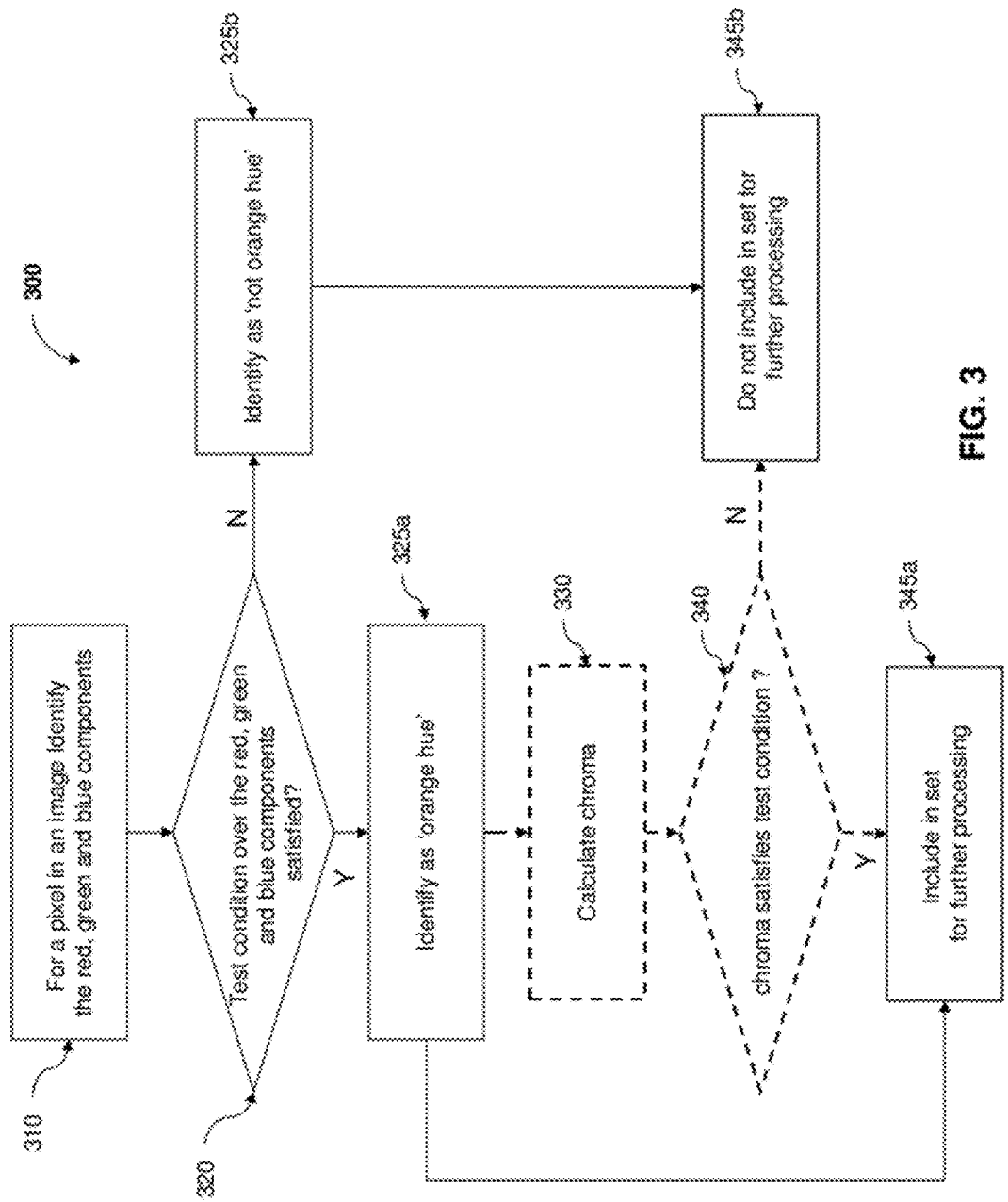
FIG. 3 is a flow diagram depicting example operations to detect orange hue in an image.

Referring now to FIG. 3, a flowchart 300 represents a particular arrangement of operations in a processor to detect orange hue in an image. In some implementations such operations allow fast identification of skin tone from RGB components without color space transforms and/or divisions. Such operations are therefore suitable for hardware applications and implementations on mobile computing devices with limited processor power.

In some implementations, such operations execute a method for detecting orange hue in one or more areas in a digital image in the RGB color space. Operations may include identifying the red, green and blue components of the RGB model for the image pixels (step 310). In some implementations, such identification is done for each pixel in the image before further processing. Operations may further include checking for a test condition based on the red, green and blue components (step 320). The test condition may be configured to detect whether the test pixel should be included in a set of interest. For example, the test pixel may be checked to see whether or not it represents an orange hue. In some implementations, checking for orange hue includes testing whether the value for the red component 'r' is greater than (or equal to, in a limiting case) the value for the green component 'g'. Checking for orange hue also includes testing whether the value for the green component 'g' is greater than (or equal to, in a limiting case) the value for the blue component 'b'. In other words, the test for orange hue checks whether the r>=g and g>=b. Referring again to FIG. 2A, the test identifies if the test pixel lies in the volume 210 which is enclosed by the lines 207a, 207b, 207c, 207d 207e and 207f.

If the test pixel satisfies the condition described above, then the pixel is identified to be representing an orange hue (step 325a). On the other hand, if the test pixel fails to satisfy the above condition, the pixel is identified as not representing an orange hue (step 325b). If the test pixel is identified as orange hue, operations may further include placing or including the pixel in a first set of pixels that would be considered in further processing steps (step 345a). If the test pixel is not identified as orange hue, the pixel is placed or included in a second set of pixels that are not considered for further processing (step 345b). In some implementations the second set of pixels are masked in the original image. For example, the intensity values of the second set of pixels may be replaced by zeros in the original image. In subsequent processing, the processor may simply ignore pixels with zero values and consider only the non zero valued pixels.

In some implementations, the first set of pixels are stored with their original values for further processing. In some implementations, further operations are performed on the first set of pixels to facilitate efficient processing in subsequent steps. For example, operations may optionally include calculating a value of chrominance or chroma (step 330) for the pixels that are identified to represent an orange hue. Chrominance or chroma is an attribute in digital images that conveys the color information of the image, separately from the accompanying luminosity or luma. In general, represented as two color-difference components. For example, in the YUV color space, where Y is the luminosity component, the chroma are represented as U=(blue−luma) and V=(red−luma). In some cases, each of these difference components may have scale factors and offsets applied to them. In the RGB color space, chroma may be defined as the difference between the highest and lowest color components. In the example being discussed with respect to FIG. 3, the test in step 320 isolates only the pixels for which the red component 'r' is the highest component and the blue component 'b' is the lowest component. Therefore in such cases, the chroma may be calculated as a difference between the red and blue components. Such an operation is faster and more efficient than the usual chroma calculation in RGB space which requires identification of the highest and lowest component prior to calculating the chroma. By working on a subset of pixels where red 'r' and blue 'b' has already been identified as the highest and lowest component, respectively, the chroma calculation can be calculated very fast.

Operations may also optionally include checking if the calculated chroma value satisfies a test condition (step 340). In some implementations, the chroma may be tested against a threshold k, for example whether $$r-b \geq k$$

to further determine whether a pixel from the first set of pixels should be considered for further processing. In some implementations the test condition may be to test whether the chroma value lies in a predetermined range, for example whether $$k_1 \leq (r-b) \leq k_2$$

where $k_1$ and $k_2$ are predefined values. The threshold k or the predefined values $k_1$ and $k_2$ may be determined empirically or based on one or more pre-defined criteria. For example, such values may be determined to mask out regions of highlights and shadows even if the corresponding pixels satisfy the condition of orange hue. In other words, by weighting or filtering out chroma values below a certain threshold, some white, black or gray pixels are effectively filtered out as low-confidence skin-tone classifiers. In some implementations, the thresholds may be dynamically set depending on lighting conditions or image histogrammetry. For example, in some implementations, the value of k may be set between 0 and 0.1.

If the calculated chroma value satisfies the test condition, the corresponding pixel is included in the set of pixels that are considered for further processing (step 345a). Otherwise, the corresponding pixel is not included in the set of pixels considered for further processing (step 345b). In some implementations, the method described above is repeated for all pixels in a given image. In some cases, a subset region of a given image may be pre-identified as a potential region for the presence of faces. In such cases, the above methods are repeated for each pixel in the subset region.

Referring now to FIGS. 4A to 4E, different stages of face detection is illustrated with the help of an example image 400. FIG. 4A shows the original image 400 acquired using an image capture device. In some implementations, the original image 400 may be the raw image captured by the image capture device. In some implementations, the original image may be a downscaled version of the raw image. The original image may also be received in a compressed form and decompressing may be required prior to any subsequent operation on the image. Even though the example image 400 shows only a single face, the methods and systems described herein may be applied to other images with any number of faces or regions of skin tone. In general, the original image 400 may be tilted at an arbitrary angle 415 with respect to the normal. The arbitrary angle 415 may be determined as the angle between an imaginary line 410 depicting the normal and an imaginary line 405 connecting two points on the image. For example the imaginary line 405 may be the principal axis of a face in the image.

In some implementations, the image 400 is corrected for the tilt to obtain a tilt corrected image 420 as shown in FIG. 4B. Such tilt correction may be done in different ways. In some implementations, image rotating algorithms may be used to correct for the tilt. In some implementations, if the capture device is equipped with an accelerometer, then information from the accelerometer may be used to quickly determine and correct for the tilt. Referring now to FIG. 4C, a masked image 425 is shown. The masked image 425 may be generated as a temporary image derived from the original image 400. In this example the masking has been done based on skin-tone detection as described with reference to FIG. 3. In this example, pixels in only a region 430 is left in their original form while most other pixels that do not correspond to skin tone are replaced by black or zero valued pixels. Such masking ensures that the region of interest for a subsequent face detection algorithm does not include pixels or regions where the presence of a face is highly unlikely. This way most background pixels are eliminated from the set of pixels considered in the face detection algorithm. In most images, such masking results in a manifold increase in the speed of the face detection algorithm since redundant computations are reduced greatly.

In some implementations, the methods and systems described above may also accomplish additional functionalities. This is shown by example in FIG. 4D. In this example, in addition to masking out non-skin tone pixels, identifying pixels in a region of interest 430 and calculating a chroma score for at least a subset of the pixels, a bounding box 435 may also be defined in the same pass. A bounding box may define a more general area of interest in which the skin tone pixels are identified. In some implementations, this information may be used to crop the original image to obtain a smaller effective image for subsequent processing. The bounding box may be defined as the largest rectangular area that encompasses each of the detected skin tone pixels. For example, in a scan from the top left hand corner to the bottom right hand corner of the image, if the first and last positions of skin tone pixels are $(x_1, y_1)$ and $(x_2, y_2)$, respectively, then the vertices of the bounding box will be $(x_1, y_1)$, $(x_1, y_2)$, $(x_2, y_1)$ and $(x_2, y_2)$. This is shown in FIG. 4D. Finally, the face detection algorithm may be run on the cropped image and/or the region of interest 430. FIG. 4E shows the results of the face detection where a face region 105d, an eye region 110d and a pair of eyes 115d are detected and showed on the original image 400. In some implementations, the face and eye regions and the eyes are detected on a tilt corrected image. A inverse operation to the tilt correction may then be carried out to map the detected regions on to the original tilted image.

In some cases, the orange-hue based skin tone detection may falsely identify some pixels to depict skin tone. For example, pixels in the background that satisfy the test conditions described with reference to FIG. 3 but do not represent skin information may be included in the set of interest. Referring back to FIG. 4C, region 427 shows such pixels that do not represent skin information but show up as noise or speckles by virtue of the presence of an orange hue in them. However, the methods and systems described above, in general, correctly identifies substantially all pixels that do represent skin information. In other words, the number of false negatives are reduced greatly at the cost of some false positives.

Fast Detection of Skin Tone in YUV Color Space

Fast skin tone detection may also be implemented in other Cartesian color spaces such as the YUV color space. The YUV is a color space typically used for digital videos. In the YUV color space, a color image or video is encoded taking human perception into account. Since human eyes recognize brightness or intensity more effectively that color levels, the YUV features a dedicated component for the same. The Y component determines the brightness of the color (referred to as luminance or luma), while the U and V components determine the color itself (the chroma). In general, Y ranges from 0 to 1 (or 0 to 255 in digital formats), while U and V range from −0.5 to 0.5 (or −128 to 127 in signed digital form, or 0 to 255 in unsigned form). Since the U and V components represent the color, the Y component of an image, by itself, represents a grayscale version of the image. On the other hand, color information is completely represented by the U and V components and therefore the UV plane can be used as a Cartesian color space for fast detection of skin tone.

Figure 5:
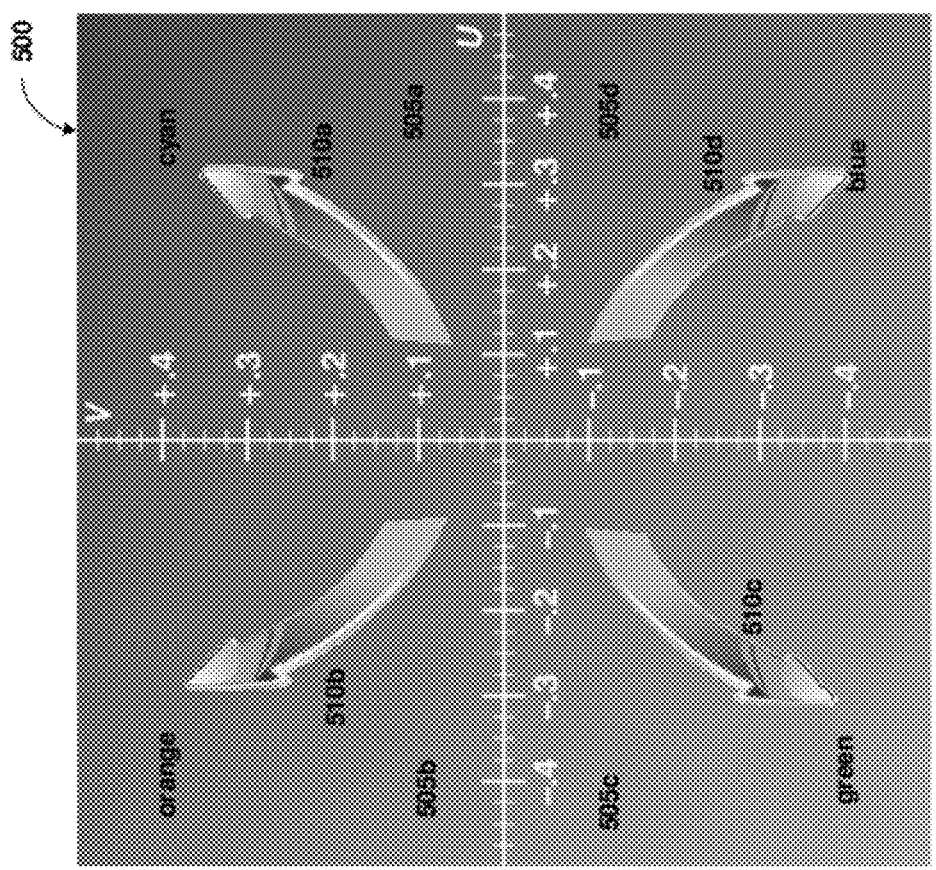
FIG. 5 shows the UV plane in the YUV color space.

Referring now to FIG. 5, the UV plane 500 of a YUV color space is shown. Each coordinate point on the UV plane 500 denotes a particular hue or color. Based on the distribution of the colors on the UV plane 500, certain regions may be identified to have various shades of a color or hue. For example, the first (or top right) quadrant 505a of the UV plane 500 has various shades of cyan while the second (or top left) quadrant 505b has different shades of orange. Similarly, the third (or bottom left) quadrant 505c has various shades of green and the fourth (bottom right) quadrant 505d has various shades of blue. The arrows 510a-510d denote directions of increase of the corresponding color. For example, the arrow 510b shows the direction of increase of orange hue in the second quadrant 505b.

In some implementations, a pixel may be tested for orange hue based on whether the pixel lies in the second quadrant of the UV color plane. Such detection of orange hue may be used as a basis for fast detection of skin tone in digital images in the YUV color space. Since skin tones of most individuals, irrespective of their ethnicity, are variations or shades of an orange hue, most human skin tones are present in the second quadrant 505b of the UV color plane 500.

Figure 6:
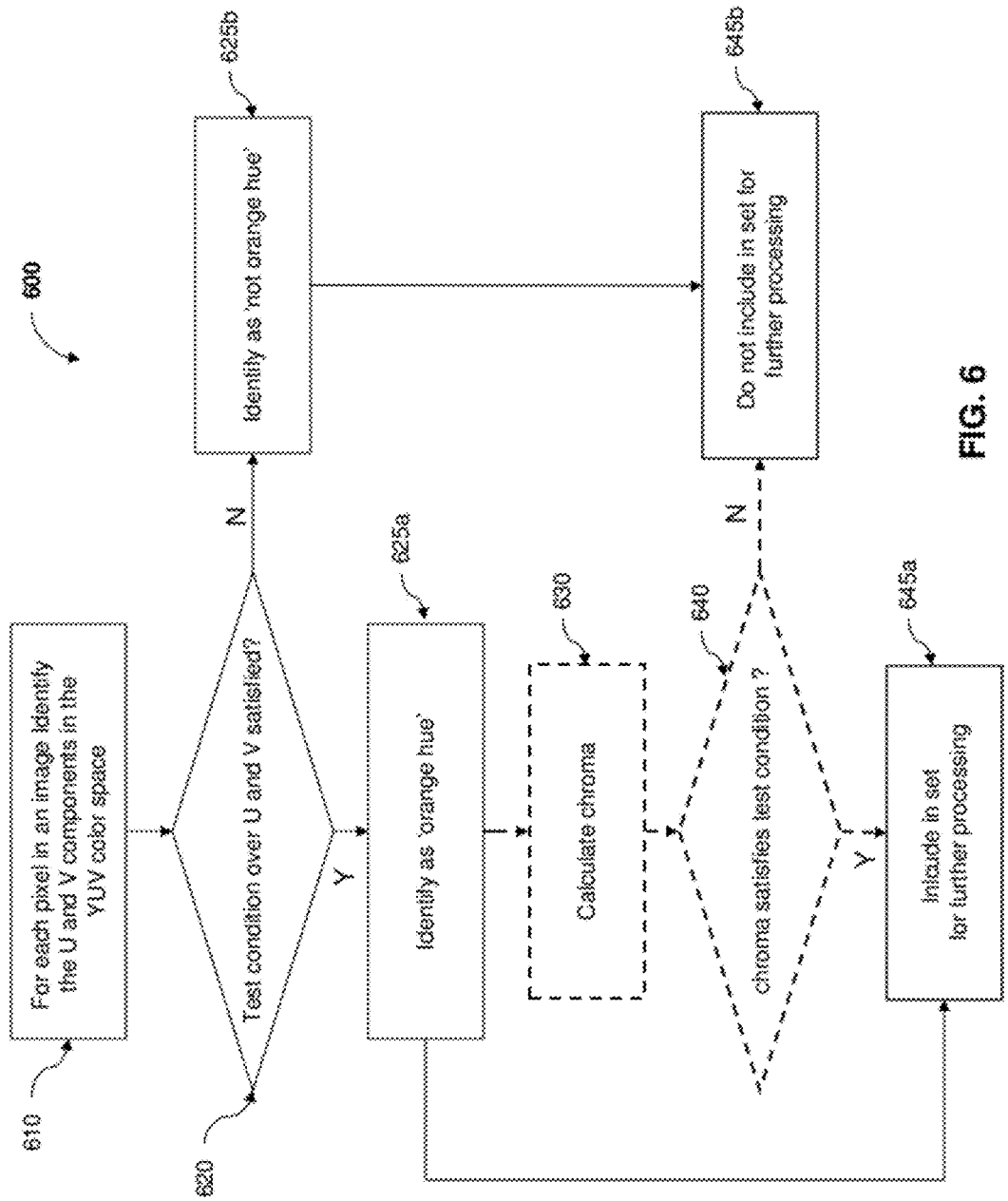
FIG. 6 is a flow diagram depicting example operations to detect orange hue in an image.

Referring now to FIG. 6, a flowchart 600 represents a particular arrangement of operations in a processor to detect orange hue in an image. In some implementations such operations allow fast identification of skin tone from U and V components without color space transforms and/or divisions. Such operations are therefore suitable for hardware applications and implementations on mobile computing devices with limited processor power. The operations are particularly useful in digital video (for example in HD transmissions) where the media is already in the YUV color space.

In some implementations, such operations execute a method for detecting orange hue in one or more areas in a digital image in the YUV color space. Operations may include identifying the U and V components of the YUV model for the image pixels (step 610). In some implementations, such identification is done for each pixel in the image before further processing. Operations may further include checking for a test condition based on the U and V components (step 620). The test condition may be configured to detect whether the test pixel should be included in a set of interest. For example, the test pixel may be checked to see whether or not it represents an orange hue. In some implementations, checking for orange hue includes testing whether the pixel lies in the second quadrant 505b of the UV plane depicted in FIG. 5. In other words, a test is performed to see if the U component is less than (or, in a limiting case, equal to) zero and the V component is greater than (or, in a limiting case, equal to) zero. In some implementations, the range of U and/or V may be further fine tuned to suit a particular application. For example, if it is known that the type of skin tone that is to be detected is from light skinned people, the ranges of U and/or V may be adjusted to determine if a pixel lies in a sub-region of the second quadrant 505b. Similarly, if the type of skin tone to be detected is known to be dark, the ranges of U and/or V may be adjusted to test for another sub-region in the second quadrant 505b.

If the test pixel satisfies the condition described above, then the pixel is identified to be representing an orange hue (step 625a). On the other hand, if the test pixel fails to satisfy the above condition, the pixel is identified as not representing an orange hue (step 625b). If the test pixel is identified as orange hue, operations may further include placing or including the pixel in a first set of pixels that would be considered in further processing steps (step 645a). If the test pixel is not identified as orange hue, the pixel is placed or included in a second set of pixels that are not considered for further processing (step 645b). In some implementations the second set of pixels are masked in the original image. For example, the intensity values of the second set of pixels may be replaced by zeros in the original image. In subsequent processing, the processor may simply ignore pixels with zero values and consider only the non zero valued pixels.

In some implementations, the first set of pixels are stored with their original values for further processing. In some implementations, further operations are performed on the first set of pixels to facilitate efficient processing in subsequent steps. For example, operations may optionally include calculating a value of chrominance or chroma (step 630) for the pixels that are identified to represent an orange hue. Chrominance or chroma is an attribute in digital images that conveys the color information of the image, separately from the accompanying luminosity or luma. In general, chroma is represented as two color-difference components. For example, in the YUV color space, the chroma may be represented as U=(blue−luma) and V=(red−luma). In some cases, each of these difference components may have scale factors and offsets applied to them. In some implementations, the chroma associated with a pixel may be calculated as the distance of the pixel in the UV plane 500 from the origin. In some implementations, the true distance may be calculated as:

$$d=\sqrt{(U^2+V^2)}$$

In some implementations, where calculating the true distance is computationally expensive and/or slow, the chroma may be quickly calculated as an average of the U and V components.

Operations may also optionally include checking if the calculated chroma value satisfies a test condition (step 640). In some implementations, the chroma may be tested against a threshold k, for example whether $$d \geq k$$

to further determine whether a pixel from the first set of pixels should be considered for further processing. In some implementations the test condition may be to test whether the chroma value lies in a predetermined range, for example whether $$k_1 \leq d \leq k_2$$

where $k_1$ and $k_2$ are predefined values. The threshold k or the predefined values $k_1$ and $k_2$ may be determined empirically or based on one or more pre-defined criteria. For example, such values may be determined to mask out regions of highlights and shadows even if the corresponding pixels satisfy the condition of orange hue. If the calculated chroma value satisfies the test condition, the corresponding pixel is included in the set of pixels that are considered for further processing (step 645*a*). Otherwise, the corresponding pixel is not included in the set of pixels considered for further processing (step 645*b*). In some implementations, the method described above is repeated for all pixels in a given image. In some cases, a subset region of a given image may be pre-identified as a potential region for the presence of faces. In such cases, the above methods are repeated for each pixel in the subset region.

The methods and systems described above may be used in applications other than skin tone detection without deviating from the scope of this application. For example, if some application requires detection of blue hue instead of orange, the test may be modified to detect whether a pixel lies in the first quadrant 505*a* or at least in a sub-region therein. Similar other modifications are also within the scope of the application.

Fast Noise Reduction in Digital Images

In some cases, orange-hue based skin tone detection may falsely identify some pixels to depict skin tone. For example, pixels in the background that satisfy certain test conditions but do not represent skin information may be included in the set of interest. Referring back to FIG. 4C, region 427 shows such pixels that do not represent skin information but show up as noise or speckles by virtue of the presence of an orange hue in them. Such speckles or noise may result in false positives in subsequent processing such as face detection. For example, a speckle may falsely be detected as an object sub-feature such as a false eye in a face. Even though existing algorithms for noise reduction and speckle removal may be used in such cases, these algorithms are computationally expensive and therefore generally not suitable for platforms with limited computing resources. The present application describes fast methods and systems of reducing noise in digital images that may otherwise increase the false positives in subsequent processing. The methods and systems may be used for noise reduction that prioritizes speed over thoroughness and are particularly suitable for mobile computing platforms and devices.

Figure 7A:
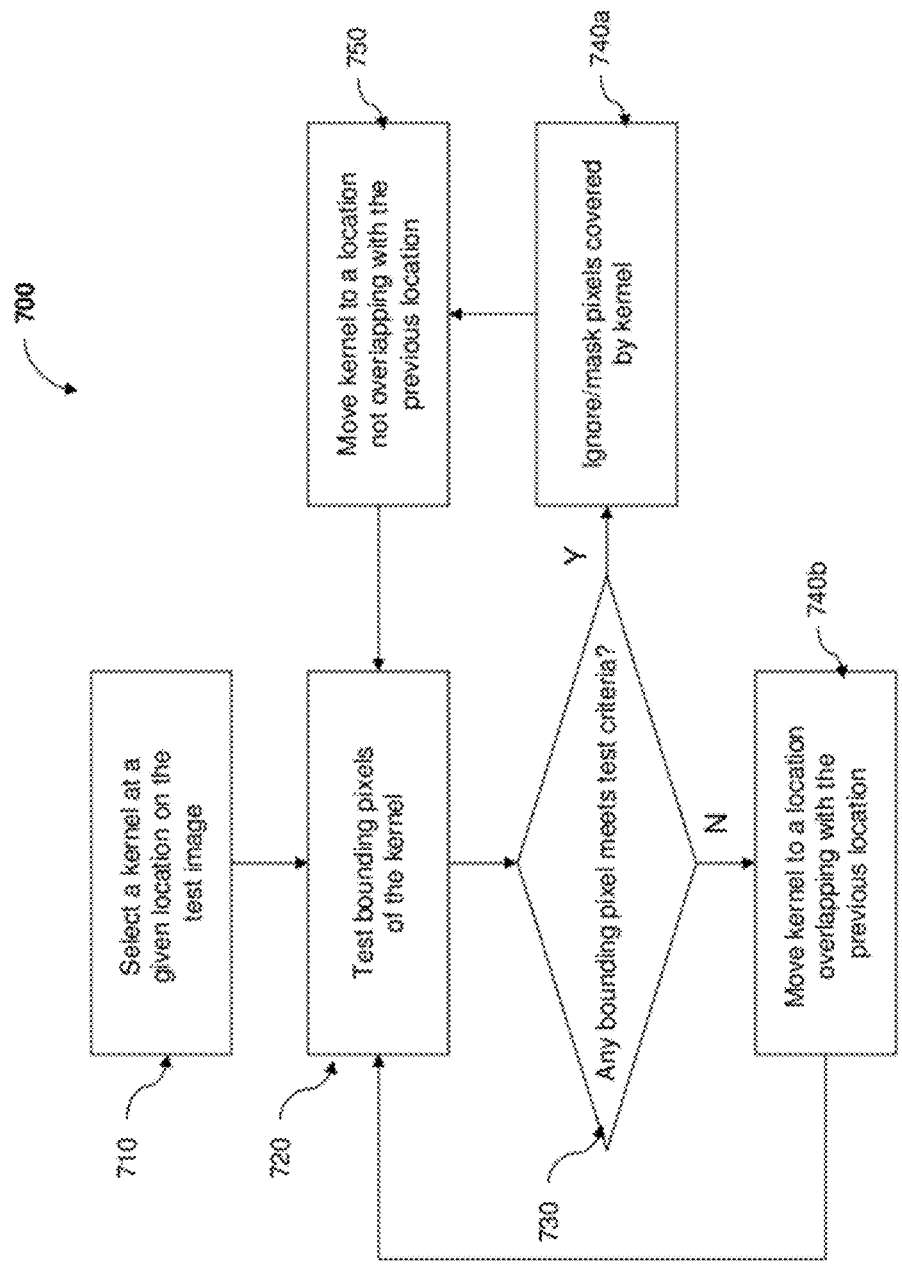
FIG. 7A is a flow diagram depicting example operations to reduce noise in an image.

Referring now to FIG. 7A, a flowchart 700 represents a particular arrangement of operations in a processor to reduce noise in an image. In some implementations such operations allow quick and computationally efficient noise reduction thereby facilitating increased efficiency in subsequent processing of the image. Such quick and efficient noise reduction is achieved by processing groups of pixels based only on information computed for a subset of the groups. For example, a block of pixels may be quickly processed based on computations done only on the pixels forming the boundary of the block.

In some implementations, operations include selecting a digital filter kernel at a given location on the test image (step 710). A filter kernel is a matrix of filter coefficients that are applied to pixels in an image for a given purpose. For example, when a (n×m) filter kernel is placed on a (n×m) pixel block of an image that includes a pixel of interest, the filtering may involve multiplying each of the kernel values with the corresponding underlying pixel value and replacing the pixel of interest with the sum of the products. The location of the pixel of interest with respect to the kernel may be chosen in many ways. For example, the (n×m) kernel may be positioned with respect to the pixel of interest such that the top left hand corner of the kernel overlaps with the pixel of interest. In other cases, the center of the kernel may overlap with the pixel of interest. Referring now to FIG. 7B, an example position of a (n×m) kernel 770 on an image 765 is shown. In other words, the dimension of the kernel 770 is n rows by m columns. The shaded part of the kernel 770 depicts the bounding rows and columns of the kernel 770. In some implementations, the dimensions n and m are chosen in accordance with the application. For example, in face detection applications, the (n×m) kernel 770 may be chosen to be sufficiently small such that anything smaller than the kernel is assumed not to be an object of interest. In general, there is a trade-off between speed and accuracy of noise reduction with respect to the kernel size. The speed of noise reduction increases with the increase in kernel size. However, the probability of a bounding pixel being a skin tone pixel also increases with the kernel size thereby leading to increased number of false positives. In some implementations, the kernel size may be chosen based on optimal hardware boundaries.

Referring again to FIG. 7A, operations include testing a subset of pixels covered by the kernel (step 720). In some implementations, the subset may be the bounding pixels of the block covered by the kernel. Referring again to FIG. 7B, such bounding pixels are the pixels overlapped by the shaded parts of the kernel 770. In some implementations, the subset may include more than one bounding row or column on each side. For example, the subset may include two or more outermost rows and columns defining the boundary of the block covered by the kernel.

In some implementations, the test involves checking if one or more of the bounding pixels satisfy one or more test criteria (step 730). For example, the test may include checking whether one or more of the bounding pixels are identified as skin tone. The skin tone identification may be performed using various algorithms including the fast skin tone detection methods described herein. The test may further include calculating chroma score for the test pixels and checking whether the chroma score meets a threshold criteria. In case of skin tone detection, a success for the test may be defined as the case when none of the bounding pixels are detected as skin tone pixels. Similarly, a failure in such a case would be when one or more of the bounding pixels are determined as skin tone pixels. In some implementations, success or failure may also be defined based on a certain number or percentage of bounding pixels satisfying the test criteria. For example, in case of skin tone detection, a success for the test may be defined as the case when less than 10% of the bounding pixels are detected as skin tone pixels.

If the test criteria is met for a given position of the kernel, operations may include ignoring and/or masking pixels covered by the kernel at that position (step 740*a*). For example, in case of skin tone detection, if the bounding pixels are not detected to be skin tone pixels according to some criteria, the block enclosed by the bounding pixels is masked or otherwise ignored in further processing. The non-bounding or internal pixels are not tested thereby increasing the speed of the process. This way, speckles or noise that do not lie in a region of interest are quickly eliminated from further processing. The kernel is then moved to a location that does not overlap with the previous location (step 750). This way, a new set of pixels from the image is considered for noise reduction. Steps 720 and 730 are then repeated for the new location of the kernel.

If the test criteria is not met for a given position of the kernel, operations include moving the kernel to a location that overlaps with the previous location in some way (step 740*b*). Continuing with the example of skin tone detection, if skin tone is detected in bounding pixels for a kernel location, the kernel is shifted over to the next pixel position, e.g. moved horizontally by one pixel and/or vertically by one pixel. In some implementations, when an entire row meets the criteria whereas other bounding pixels do not, the kernel may be shifted down to the next row. Steps 720 and 730 are repeated for the new position of the kernel.

The kernel is thus moved over the image to perform quick noise reduction as described above. In some implementations, multiple passes may be used to improve the quality of filtering. For example, boundaries at the edges of the kernels may be missed in a first pass. In such cases, a second or more passes may be used to clean up such edge conditions. In some implementations, the second pass uses a smaller kernel size. The dimensions in a second pass may be relatively prime to the dimensions used in the first pass. In some implementations, a second pass may use substantially the same dimensions as in the first pass. In such cases, the edge conditions may still be cleaned up by using a different initial position of the kernel as compared to the first pass. For example, a fast machine boundary (e.g. a byte, word or int) can be used for the first pass, and a prime boundary (e.g. 13) can be used for the second pass to catch edge conditions that may have been missed in the first pass.

Figure 7C:
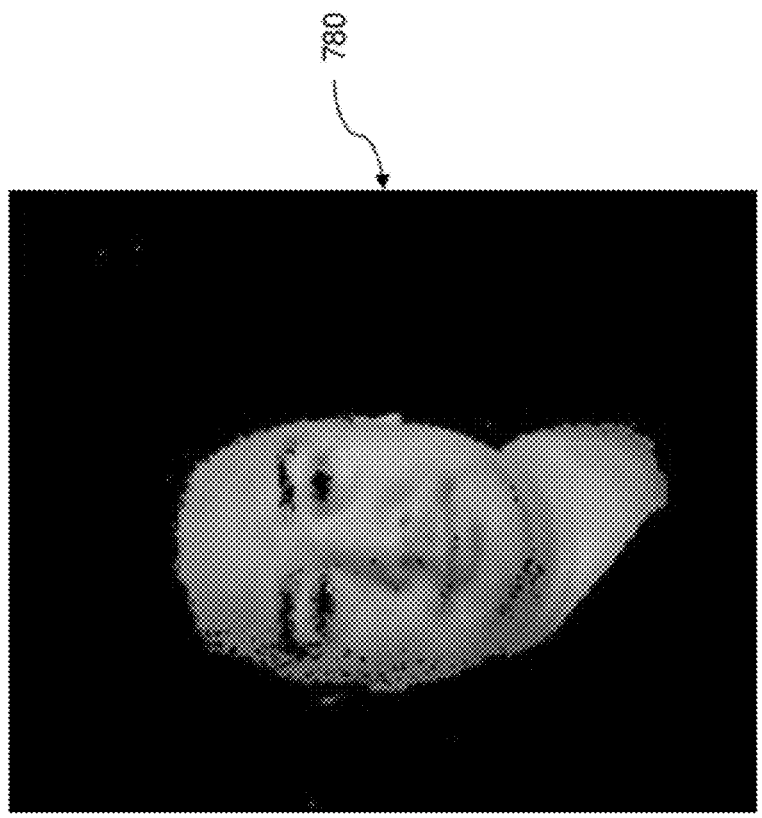
FIGS. 7B and 7C show example images before and after noise reduction, respectively.
Figure 7B:
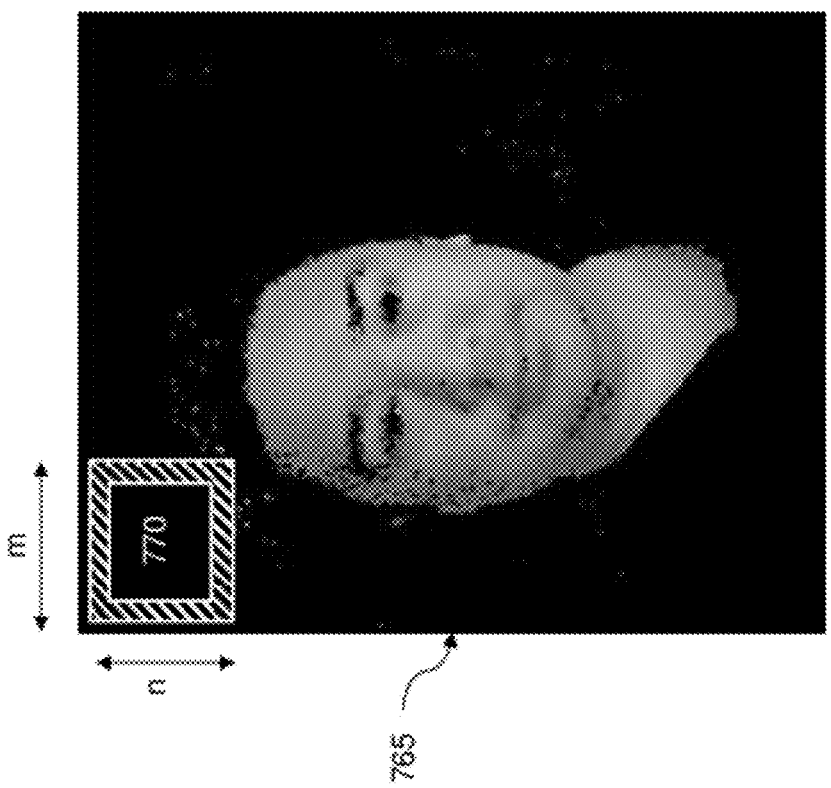

Referring now to FIG. 7C, a noise reduced image 780 shows the effect of the noise reduction methods and systems described above. The image 780 has significantly less speckles as compared to the noisy image 765 and thus results in reduced false positives in subsequent processing steps. While the fast noise reduction has been described with the example of skin tone detection, the described may be used for other fast processing applications without deviating from the scope of this application. For example, the method may be extended to other applications by changing the test criteria and/or the subset of pixels considered for the different kernel locations.

Chroma Score Based Processing

Image understanding for artificial intelligence applications require various image processing operations. These include applications including shape detection, edge detection, region segmentation, color quantization and image compression. These operations extract information from images in order to make the images more meaningful to digital systems. For example, various edge detectors detect changes in image brightness from one region to another to capture the presence of edges. In some cases, applying an edge detector to an image may lead to a set of connected curves that indicate boundaries of objects in the image. Edge detection may be used for filtering out less relevant details while preserving important structural properties of the image, thereby reducing computing burden on the processor. In some cases, subsequent image interpretation is simplified via edge detection. Similarly, operations such as shape detection, region segmentation and color quantization help in interpreting images and make images more meaningful to automated systems.

Digital images are often represented using color information such as hue and brightness information such as luminosity. Most image processing operations use either hue or luminosity information from digital images. For example, luminosity based edge detectors identifies points in a digital image where the luminosity (or brightness or intensity) has discontinuities. Similarly, hue or color based edge detection detects discontinuities in color distribution to identify edges. For example, the border between a block of red color and a block of yellow color in a digital image may be identified as an edge.

When humans view a scene, instead of relying only one of hue and luminosity, they rely on both in order to detect edges and shapes. For example, when the human eye detects a dark object in a brightly lit background, it depends on the luminosity information to do so. On the other hand, when distinguishing two objects of different colors under the same lighting conditions, hue information is relied upon. The present application describes methods and systems where both hue and luminosity information is used for image processing applications such as edge and shape detection.

In some implementations, whether the hue or luminosity for a particular pixel is used, is determined based on a chroma value of the particular pixel. For example, the hue is taken as the predominant indicator of an edge or shape when the corresponding chroma value is high and the luminosity is taken as the predominant indicator when the corresponding chroma value is low.

Figure 8:
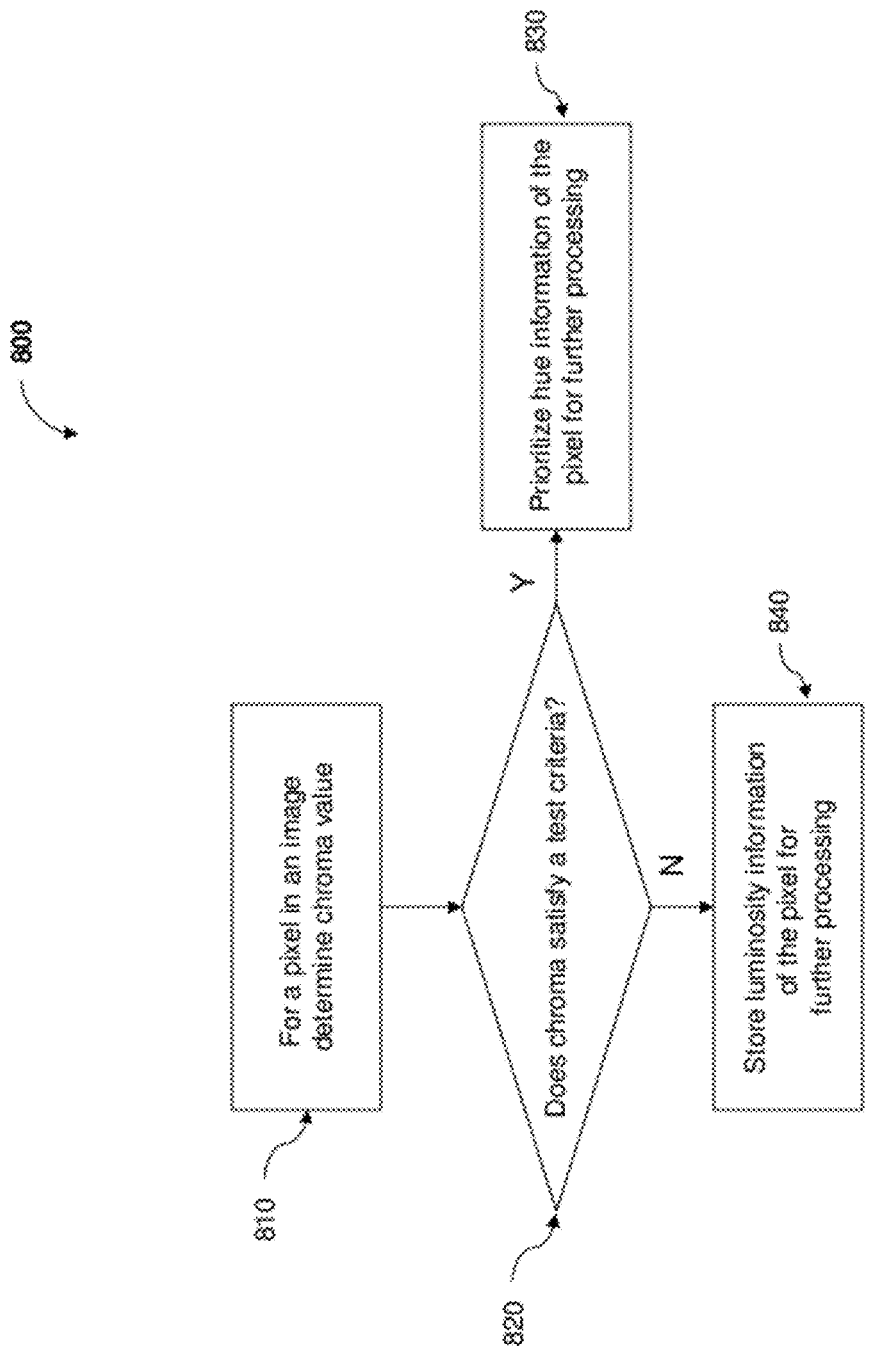
FIG. 8 is a flow diagram depicting example operations in a chroma score based processing of an image.

Referring now to FIG. 8 a flowchart 800 represents a particular arrangement of operations in a processor to determine whether the hue or luminosity information corresponding to a pixel is to be stored for further processing. The operations include determining a chroma value for an image in a pixel (step 810). In some implementations, the chroma value is determined as the difference between the highest and lowest components corresponding to the pixel value. For example, for an RGB image, the red (R), green (G) and blue (B) components are determined for a pixel and the lowest component is subtracted from the highest component to determine the chrominance or chroma. In some implementations, such as for images in the YUV color space, the chroma associated with a pixel may be calculated as the distance of the pixel in the UV plane from the origin. In some implementations, the true distance may be calculated as:

$$d = \sqrt{(U^2 + V^2)}$$

In some implementations, where calculating the true distance is computationally expensive and/or slow, the chroma may be quickly calculated as an average of the U and V components. The chroma may be calculated for a group of pixels of interest prior to further operations or may be calculated for each pixel on the fly. In some implementations, the calculated chroma value may be manipulated further. For example, for the YUV color space example, the calculated chroma value may be weighted by the corresponding Y value and the value of the distance d. For example, the chroma can be used to weight the significance of luminosity (Y) against hue (UV). Since in a YUV color space, chroma is the distance from the origin, the distance d may be approximated as the average of the absolute UV values. In the case of edge detection, luminosity and hue deltas can be calculated and then the chroma can be used to obtain a weighted score.

Operations also include determining if the calculated chroma value satisfies a test criteria (step 820). In some implementations the test condition can be whether the chroma is higher than a given threshold. The threshold may be determined empirically or by other experiments. In some cases, the threshold may be determined and/or adjusted based on the application at hand. For example, a first application may require the chroma value to satisfy a low threshold while the threshold is higher for a second application. In some implementations, the test condition can be whether the chroma lies within a given range.

In some implementations, the thresholding can include comparing the difference between a pixel and its neighbors (in other words, determining the slope of change in pixel values). One or more neighbors may be included in such comparisons. The change can then be appropriately weighted and/or thresholded such that an edge is satisfactorily rendered. In some implementations, for example in grayscale images, thresholding can include determining changes in value/lightness between a pixel and its neighbors. In some implementations, the thresholding can include comparing changes in chroma values between a pixel and its neighbors.

If the chroma satisfies the test condition, operations include prioritizing one of the hue and luminosity information for further processing. For example, if the test condition is whether the chroma is higher than a given threshold, then on satisfying the test condition the hue information of the corresponding pixel is prioritized for further processing (step 830). In some implementations, prioritizing includes storing the hue information corresponding to the pixel for further processing. The information may be stored on the memory of a computing device as a part of a database. In some implementations, prioritizing includes assigning more weight to the significance of hue than to the significance of luminosity for the given pixel. The stored or weighted hue information may then be used for subsequent image processing operations such as edge detection, segmentation and color space reduction.

If the test condition is not satisfied, operations may include prioritizing the luminosity information of the pixel for further processing (step 840). The prioritizing may be done in substantially the same way as described with respect to step 830. In some implementations, the luminosity information is stored in a separate database from the one storing the hue information. In some implementations, the hue and luminosity information are stored in the same database with appropriate identifiers.

The example of FIG. 8 shows prioritizing the hue information if the test condition is satisfied and the luminosity information if the test condition is not satisfied. However, in some implementations, the luminosity information may be prioritized if the test condition is satisfied. In some implementations, histograms may be created and scored from the stored or weighted hue and luminosity information. Such histograms may be used for comparison and sorting purposes.

Figure 9C:
FIGS. 9C and 9D show thresholded versions of the grayscale and chroma images, respectively.
Figure 9D:

Referring now to FIGS. 9A-9F, an example shows the effectiveness of chroma based processing as opposed to a non chroma-based processing. In this example, the effectiveness of chroma based processing is illustrated using edge detection. FIG. 9A shows the grayscale or luminosity version of an original image while FIG. 9B shows the chroma image. FIGS. 9C and 9D show the thresholded versions of the gray image and the chroma image, respectively. The thresholding of the chroma image is done as described above with respect to FIG. 8. In other words, the hue information is stored for the pixels where the chroma exceeds a threshold and the luminosity information is stored for the pixels where the chroma does not exceed the threshold. FIGS. 9E and 9F show the results of an edge detection operation on the thresholded gray and chroma images, respectively. The chroma based edge detection shown in FIG. 9F is seen to be more effective than the gray image based edge detection. For example, the edge 910*a* (FIG. 9E) is not clearly detected in the gray image based detection but the corresponding edge 910*b* (FIG. 9F) is clearly detected in the chroma based detection. On the other hand, multiple false edges are detected in the region 920*a* of FIG. 9E whereas such false edges are not detected in the corresponding region 920*b* of FIG. 9F.

System Overview

Figure 10:
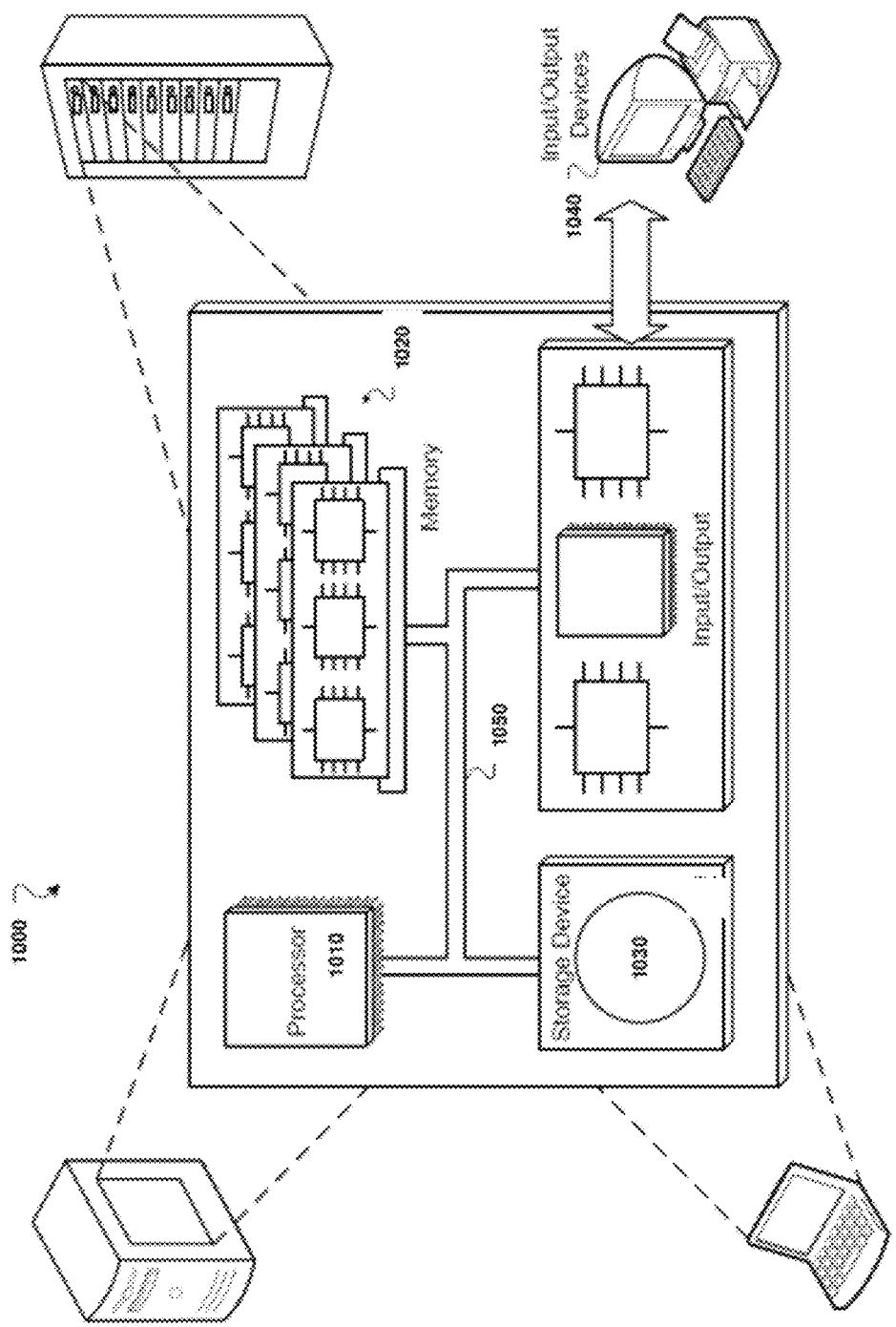
FIG. 10 is a block diagram of a computing system.

FIG. 10 is a schematic diagram of a computer system 1000. The system 1000 can be used for the operations described in association with any of the computer-implemented methods described herein, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In some implementations, the memory 1020 is a computer-readable medium. The memory 1020 can include volatile memory and/or non-volatile memory.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In some implementations, the input/output device 1040 includes a keyboard and/or pointing device. In some implementations, the input/output device 1040 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processor 110 carries out instructions related to a computer program. The processor 110 may include hardware such as logic gates, adders, multipliers and counters. The processor 110 may further include a separate arithmetic logic unit (ALU) that performs arithmetic and logical operations.

A number of implementations have been described. Nevertheless, it will be understood that various modifications may be made without departing from the spirit and scope of the following claims. For example, the techniques described herein can be performed in a different order and still achieve desirable results.

The invention claimed is:

1. A method performed by a software process executing on a computer system, the method comprising:
   obtaining a digital image comprising a plurality of pixels encoded in a YUV color space, each pixel having a luma component of value Y, a blue color-difference component of value U and a red color-difference component of value V;
   for a specified pixel having a point (U,V) in a U-V color plane, calculating
      whether U is less than a first threshold and V is greater than a second threshold, and
      a chroma value as a distance of the point (U, V) from an origin on the U-V color plane, wherein the distance of the point (U, V) from the origin on the U-V color plane is calculated as an average of U and V; and
   determining, based on a result of the calculation, whether the specified pixel potentially depicts an orange hue, and if so, whether the specified pixel potentially depicts human skin.

2. The method of claim 1, wherein the first and second thresholds are substantially equal to zero.

3. The method of claim 1, wherein determining comprises deciding that the specified pixel potentially depicts the orange hue if U is less than the first threshold and V is greater than the second threshold.

4. The method of claim 3 further comprising performing a face detection algorithm on the digital image if at least a part of the digital image is determined to potentially depict human skin.

5. The method of claim 3 further comprising, if the digital image is determined to potentially depict human skin, generating a temporary image by masking all non-orange hue areas in the digital image; and executing a face detection algorithm on the temporary image.

6. The method of claim 3 further comprising, if the digital image is determined to potentially depict human skin, generating a logical bounding box that encompasses all areas determined to include an orange hue; and executing a face detection algorithm only on a portion of the digital image within the generated bounding box.

7. The method of claim 3 further comprising comparing the calculated chroma value against a third threshold and deciding that the specified pixel potentially depicts human skin if the calculated chroma value exceeds the third threshold.

8. A method performed by a software process executing on a computer system, the method comprising:
   selecting a first set of pixels in a digital image in the YUV color space such that, for each pixel in the set, a U component is less than a first threshold and a V component is greater than a second threshold;
   identifying at least a subset of the first set as a region of orange hue in the digital image;
   calculating a chroma value for a specified pixel of the subject by determining a distance of a point (U,V) associated with the specified pixel from an origin on a U-V color plane, wherein the distance of the point (U,V) from the origin on the U-V color plane is calculated as an average of U and V; and
   comparing the calculated chroma value against a third threshold and deciding whether the specified pixel potentially depicts human skin based on the comparison.

9. The method of claim 8, wherein the first and second thresholds are substantially equal to zero.

10. The method of claim 8, further comprising determining that the region of orange hue potentially depicts human skin if the calculated chroma value exceeds the third threshold.

11. The method of claim 10 further comprising executing a face detection algorithm on the digital image if the region is determined to potentially depict human skin.

12. The method of claim 10 further comprising:
   if the region is determined to potentially depict human skin, generating a temporary image by masking at least some pixels in the digital image that are not part of the region; and
   performing a face detection algorithm on the temporary image.

13. The method of claim 10 further comprising, if the region is determined to potentially depict human skin, generating a logical bounding box that encompasses the region; and
   performing a face detection algorithm only on a portion of the digital image within the generated bounding box.

14. A computer program product comprising a non-transitory computer readable medium having encoded thereon instructions that, when executed, cause a computer to:
   obtain a digital image comprising a plurality of pixels encoded in a YUV color space, each pixel having a luma component of value Y, a blue color-difference component of value U and a red color-difference component of value V;
   for a specified pixel having a point (U, V) in a U-V color plane, calculate
      whether U is less than a first threshold and V is greater than a second threshold,
      a chroma value as a distance of the point (U, V) from an origin on the U-V color plane, wherein the distance of the point (U, V) from the origin on the U-V color plane is calculated as an average of U and V; and determine, based on a result of the calculation, whether the specified pixel potentially depicts an orange hue, and if so, whether the specified pixel potentially depicts human skin.

15. The computer program product of claim 14, wherein the first and second thresholds are substantially equal to zero.

16. The computer program product of claim 14, wherein the encoded instructions further cause a computer to decide that the specified pixel potentially depicts the orange hue if U is less than the first threshold and V is greater than the second threshold.

17. The computer program product of claim 16, wherein the encoded instructions further cause a computer to execute a face detection algorithm on the digital image if at least a part of the digital image is determined to potentially depict human skin.

18. The computer program product of claim 16, wherein the encoded instructions further cause a computer to generate a temporary image by masking all non-orange hue areas in the digital image; and execute a face detection algorithm on the temporary image, if the digital image is determined to potentially depict human skin.

19. The computer program product of claim 16, wherein the encoded instructions further cause a computer to generate a logical bounding box that encompasses all areas determined to include an orange hue; and execute a face detection algorithm only on a portion of the digital image within the generated bounding box, if the digital image is determined to potentially depict human skin.

20. A system comprising:
a processor configured to:
obtain a digital image comprising a plurality of pixels encoded in a YUV color space, each pixel having a luma component of value Y, a blue color-difference component of value U and a red color-difference component of value V;
for a specified pixel having a point (U, V) in a U-V color plane, calculate
whether U is less than a first threshold and V is greater than a second threshold, and
a chroma value as a distance of the point (U, V) from an origin on the U-V color plane, wherein the distance of the point (U, V) from the origin on the U-V color plane is calculated as an average of U and V; and
determine, based on a result of the calculation, whether the specified pixel potentially depicts an orange hue, and if so, whether the specified pixel potentially depicts human skin.

21. The system of claim 20, wherein the first and second thresholds are substantially equal to zero.

22. The system of claim 20 further configured to decide that the specified pixel potentially depicts the orange hue if U is less than the first threshold and V is greater than the second threshold.

23. The system of claim 22 further configured to execute a face detection algorithm on the digital image if at least a part of the digital image is determined to potentially depict human skin.

24. The system of claim 22 further configured to generate a temporary image by masking all non-orange hue areas in the digital image; and execute a face detection algorithm on the temporary image, if the digital image is determined to potentially depict human skin.

25. The system of claim 22 further configured to generate a logical bounding box that encompasses all areas determined to include an orange hue; and execute a face detection algorithm only on a portion of the digital image within the generated bounding box, if the digital image is determined to potentially depict human skin.

* * * * *